(12) United States Patent
Cho

(10) Patent No.: US 7,392,065 B2
(45) Date of Patent: Jun. 24, 2008

(54) MOBILE COMMUNICATION TERMINAL AND METHOD FOR ONE-TOUCH MESSAGE TRANSMISSION

(75) Inventor: Wan-Hee Cho, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 259 days.

(21) Appl. No.: 10/903,957

(22) Filed: Jul. 30, 2004

(65) Prior Publication Data

US 2005/0049007 A1 Mar. 3, 2005

(30) Foreign Application Priority Data

Aug. 29, 2003 (KR) .................. 10-2003-0060429

(51) Int. Cl.
 *H04B 1/38* (2006.01)
(52) U.S. Cl. ..................... 455/566; 455/419
(58) Field of Classification Search .......... 455/566, 455/564, 419, 418, 465, 412, 456.1–456.3, 455/575, 456, 455; 379/93.18, 93.14, 88.23, 379/88.15, 67.1, 87.1
See application file for complete search history.

(56) References Cited

U.S. PATENT DOCUMENTS

| 5,509,067 | A | * | 4/1996 | Murata ................ 379/355.09 |
| 5,875,405 | A | * | 2/1999 | Honda ...................... 455/564 |
| 5,894,506 | A | | 4/1999 | Pinter |
| 6,408,188 | B1 | | 6/2002 | Park |
| 6,823,182 | B1 | * | 11/2004 | Higuchi et al. .......... 455/412.1 |
| 2001/0017912 | A1 | | 8/2001 | Baum et al. |
| 2003/0005065 | A1 | | 1/2003 | Lin et al. |
| 2003/0078033 | A1 | | 4/2003 | Sauer et al. |
| 2004/0203614 | A1 | * | 10/2004 | Qu et al. .................. 455/412.1 |
| 2005/0143136 | A1 | * | 6/2005 | Lev et al. .................... 455/566 |

FOREIGN PATENT DOCUMENTS

DE 196 52 142 12/1996

\* cited by examiner

*Primary Examiner*—Naghmeh Mehrpour
(74) *Attorney, Agent, or Firm*—The Farrell Law Firm, PC

(57) ABSTRACT

A mobile communication terminal comprising: a key input unit including a one-touch message key and outputting a signal requesting one-touch message transmission when the one-touch message key is pressed; a display unit for displaying menus for one-touch message transmission; a memory for storing a message corresponding to the one-touch message key; and a control unit for sending the stored message corresponding to the one-touch message key when a user inputs a demand for one-touch message transmission.

14 Claims, 11 Drawing Sheets

| MESSAGING SERVICE | MESSAGE | |
|---|---|---|
| SMS | A | |
| | B | |
| | C | |
| MMS | D | |
| | E | |
| | F | |
| EMS | G | |
| | H | |
| | I | |

(A) | ONE-TOUCH MESSAGE | A | D |

FIG.6

(A) | FIRST ONE-TOUCH MESSAGE | A | D | G |

(B) | SECOND ONE-TOUCH MESSAGE | B | H |

(C) | THIRD ONE-TOUCH MESSAGE | C | D |

FIG.8

SENDER'S TERMINAL                    RECIPIENT'S TERMINAL

↓ INPUT RECIPIENT'S
↓ TELEPHONE NUMBER

↓ PRESS PAGING BUTTON (11A)                                  (11B)

MOBILE COMMUNICATION TERMINAL AND METHOD FOR ONE-TOUCH MESSAGE TRANSMISSION

PRIORITY

This application claims priority to an application entitled "Mobile Communication Terminal and Method for One-Touch Message Transmission" filed in the Korean Intellectual Property Office on Aug. 29, 2003 and assigned Serial No. 2003-60429, the contents of which are hereby incorporated by reference.

BACKGROUND OF THE INVENTION

1. Field of the Invention

The present invention relates to a mobile communication terminal, and more particularly to a mobile communication terminal and a method for sending a message using a single key input.

2. Description of the Related Art

With the development of telecommunication technologies, mobile communication terminals have been widely proliferated and developed to offer various functions with ever higher performance. Particularly, various methods have been conceived to facilitate transmission of messages using a mobile communication terminal.

Currently available mobile communication terminals can provide messaging services, such as a short message service (SMS), an enhanced messaging service (EMS) and a multimedia messaging service (MMS). SMS transmits a message in a text form only. MMS transmits a text message together with a picture, photograph or moving picture file. EMS transmits a text message together with simple picture data.

It therefore follows that a user has to take multiple steps to send a message using any of the above messaging services in a mobile communication terminal. For example, when the user wishes to send a message using a mobile communication terminal, he or she selects a messaging function from a menu or using a short key, input a message to be sent and store the inputted message in a memory of the mobile communication terminal. The user must then input, or retrieve from memory of the mobile communication terminal, the telephone number of the intended recipient of the message and finally press a send/OK key to send the message.

Moreover, when using a conventional mobile communication terminal, the user must take multiple steps of selecting menus to enter a message input mode in addition to inputting a desired message and pressing keys to send the message. Because of the amount of steps involved, the user may feel inconvenient when trying to urgently send a message, especially in critical circumstances.

SUMMARY OF THE INVENTION

Accordingly, the present invention has been made to solve the above-mentioned problems occurring in the prior art, and one object of the present invention is to provide a mobile communication terminal and a method for easily and rapidly sending a message by a single key input.

Another object of the present invention is to provide a mobile communication terminal and a method for easily paging using a single key input.

Still another object of the present invention is to provide a mobile communication terminal and a method for sending a plurality of stored messages in different forms using a single key input.

In order to accomplish the above objects, there is provided a mobile communication terminal comprising: a key input unit including a one-touch message key and outputting a signal for requesting one-touch message transmission when the one-touch message key is pressed; a display unit for displaying menus for one-touch message transmission; a memory for storing a message corresponding to the one-touch message key; and a control unit for sending the stored message corresponding to the one-touch message key when a user inputs a demand for one-touch message transmission.

There is also provided a method for sending a message using a mobile communication terminal, comprising: a first step of storing at least one message to correspond to the one-touch message key when a user inputs a demand for setting a one-touch message to be sent by a single key input; and a second step of sending the stored message corresponding to the one-touch message key when pressed by the user.

In accordance with another aspect of the present invention, there is provided a mobile communication terminal in a system supporting a paging message service, said terminal comprising: a user interface including a paging button and outputting a signal requesting paging message transmission when a user inputs a recipient's telephone number to be paged and presses the paging button; a display unit for displaying menus for paging message transmission; a radio frequency (RF) unit for performing wireless transmission of the paging message; and a control unit for sending the paging message through the RF unit when the user inputs a demand for the paging message transmission.

BRIEF DESCRIPTION OF THE DRAWINGS

The above and other objects, features and advantages of the present invention will be more apparent from the following detailed description taken in conjunction with the accompanying drawings, in which:

FIG. 2 is a table for storing messages according to the present invention.

FIG. 6 is an example of one-touch messages stored to correspond to a one-touch message key according to the first embodiment of the present invention.

FIG. 8 is a list of three examples of one-touch messages stored to correspond to each of a plurality of one-touch message keys according to the second embodiment of the present invention.

DETAILED DESCRIPTION OF THE PREFERRED EMBODIMENT

Hereinafter, preferred embodiments of the present invention will be described with reference to the accompanying drawings. Although certain elements, such as a circuit device, are specifically defined in the following description of the present invention, it will be obvious to those skilled in the art that such definitions of elements are merely to improve understanding of the present invention and that the present invention can be carried out without such specific elements. Also, in the following description of the present invention, a detailed description of known functions and configurations incorporated herein will be omitted when it may make the subject matter of the present invention rather unclear.

Figure 1:
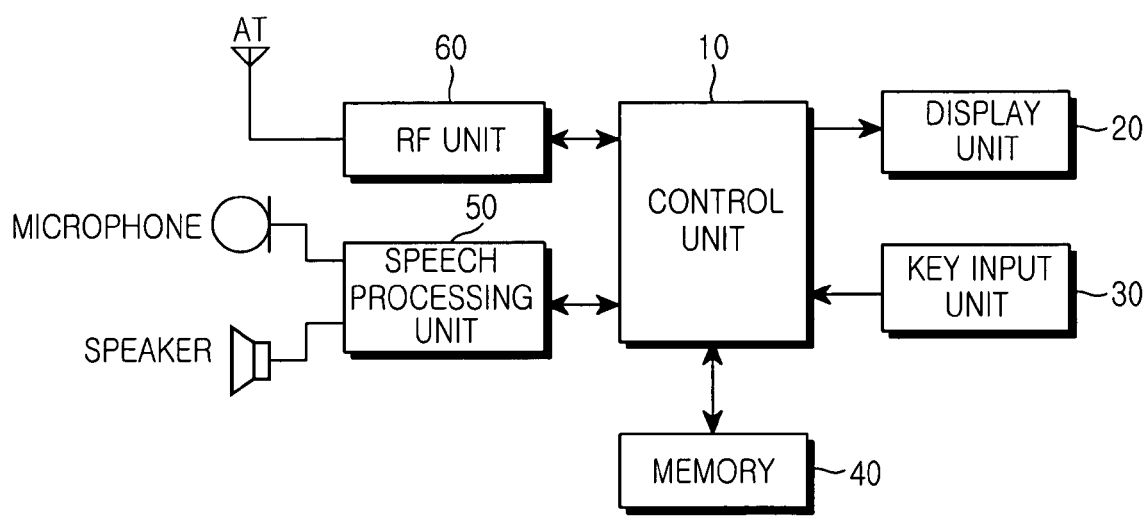
FIG. 1 is a block diagram of a mobile communication terminal according to the present invention.

FIG. 1 is a block diagram of a mobile communication terminal according to the present invention. As shown in FIG. 1, the mobile communication terminal comprises a control unit 10, a display unit 20, a key input unit 30, a memory 40, a speech processing unit 50 and a radio frequency (RF) unit 60.

The control unit 10 controls the overall operation of the mobile communication terminal. Particularly, the control unit 10 controls the operation required to send a message by a single key input according to the present invention. A message to be sent by a single key input will be referred herein to as a "one-touch message." The one-touch message can be composed of one or more messages having different message forms. In the preferred embodiments of the present invention, the one-touch message includes a general paging message.

In response to a user's demand for setting of the one-touch message, the control unit 10 controls the operation required to set the one-touch message. If the user inputs a recipient's telephone number or some recipient's identification using which the recipient's telephone number can be retrieved, and presses a key corresponding to transmission of a preset one-touch message, the control unit 10 will send the one-touch message to the recipient's telephone number. For example, the control unit 10 can set a paging message as the one-touch message. If the user inputs the recipient's telephone number and presses a key corresponding to one-touch message transmission, e.g., a paging button, the control unit 10 will send the preset paging message to the inputted telephone number.

The key input unit 30 is provided with a plurality of function keys, number keys and symbol keys. According to the first embodiment of the present invention, the key input unit 30 includes a one-touch message key. According to the second embodiment of the present invention, the key input unit 30 includes a plurality of one-touch message keys. When the user presses the one-touch message key, the key input unit 30 outputs a signal corresponding to one-touch message transmission.

The one-touch message key(s) can be implemented in various ways. For example, a one-touch message key can be separately and independently provided on the key input unit 30. More preferably, the one-touch message key can be implemented by pressing a send key for a longer or shorter duration than the key-pressing time for initiating a phone call. Alternatively, a particular number key or a symbol key, e.g., * or # key, can be used as the one-touch message key.

The display unit 20 may comprise a Liquid Crystal Display (LCD). The display unit 20 outputs various display data generated in the mobile communication terminal. Particularly, the display unit 20 displays menus for setting and sending a one-touch message.

The memory 40 comprises a Read Only Memory (ROM) and a Random Access Memory (RAM) for storing a plurality of data and programs, including a program for performing message transmission according to the present invention. More preferably, the memory 40 can store a table for classifying messages into two or more message service types.

FIG. 2 shows a table of messages stored in the memory 40. Referring to FIG. 2, the message table classifies messages, which were preset at the time of manufacture of the mobile communication terminal or inputted by the user, into several message service types, such as a short message service (SMS), a multimedia messaging service (MMS), and an enhanced messaging service (EMS).

Referring back to FIG. 1, the RF unit 60 transmits and receives speech or control data and performs one-touch message transmission under the control of the control unit 10. The speech processing unit 50 converts speech data received by the RF unit into an audible sound under the control of the control unit 10 and outputs the audible sound through a speaker. The speech processing unit 50 may also convert speech data received by a microphone and similarly output the audible sound through the speaker.

Figure 3:
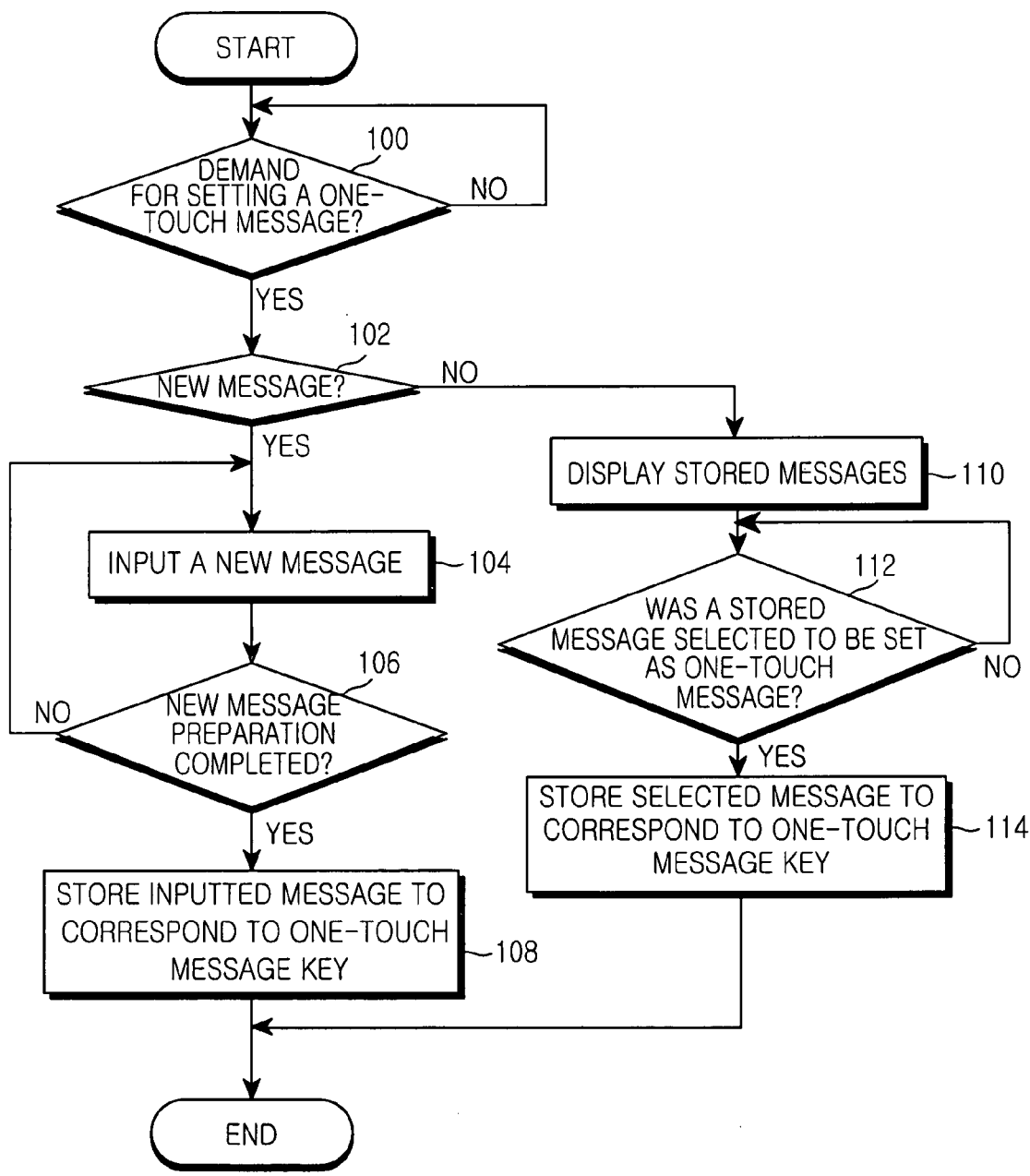
FIG. 3 is a flow chart showing a process of setting a one-touch message according to a first embodiment of the present invention.
Figure 4:
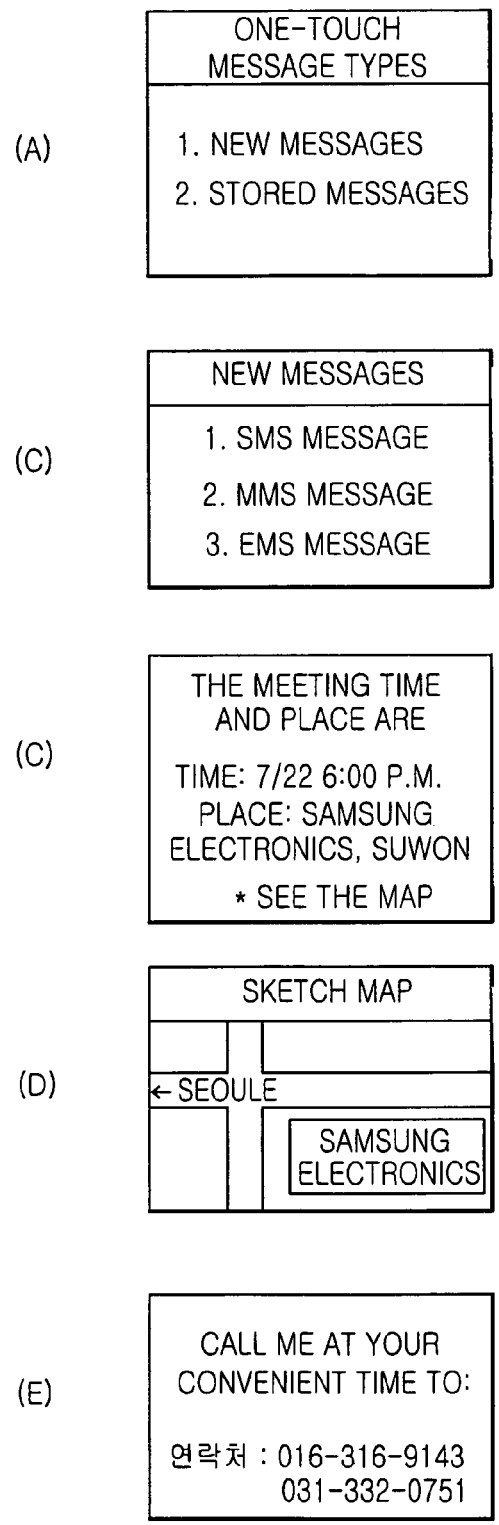
FIGS. 4 and 5 are a list of examples of messages displayed on a display unit of a mobile communication terminal during the process of setting a one-touch message according to the present invention.
Figure 5:
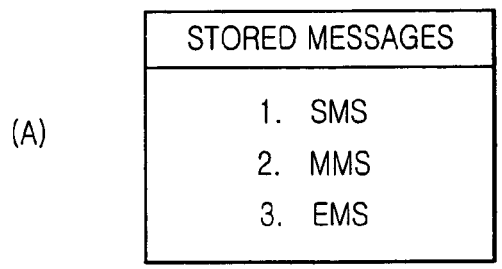
Figure 5:
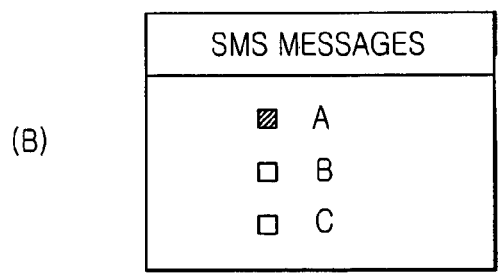
Figure 5:
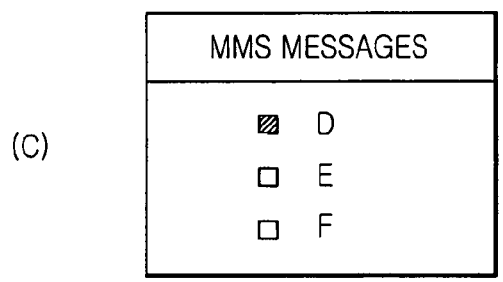
Figure 5:
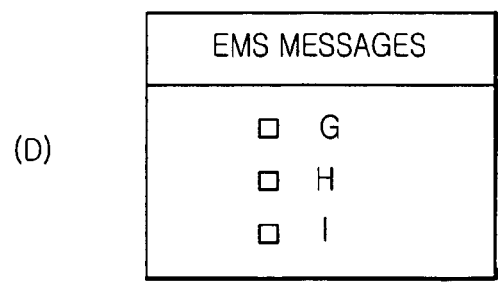

The mobile communication terminal according to the present invention sets a one-touch message upon the user's demand. FIG. 3 is a flow chart showing a process of setting the one-touch message according to the first embodiment of the present invention. FIGS. 4 and 5 show examples of messages that may be displayed on the display unit of the mobile communication terminal during the process of setting the one-touch message according to the present invention shown in FIG. 3.

Hereinafter, a process of setting a one-touch message according to the first embodiment of the present invention will be explained in more detail with reference to FIGS. 1 to 5.

As shown in FIG. 3, the control unit 10 continuously determines whether the user has inputted a demand for setting a one-touch message at step 100. The demand can be inputted via keys of the key input unit 30 (FIG. 1) or other means, such as voice commands. If the demand was inputted, the control unit 10 will proceed with step 102. More specifically, when the user presses a key or selects a menu entry corresponding to the demand for setting the one-touch message, the control unit 10 will display a menu of available types of one-touch messages and will proceed to perform step 102. As shown in FIG. 4(*a*), menu entries "1. New Messages" and "2. Stored Messages" can be displayed as the types of the one-touch messages. When "1. New Messages" entry is selected, a menu for setting a new message as the one-touch message will be displayed, while when "2. Stores Messages" is selected, a menu for setting a stored message as the one-touch message will be displayed.

At step 102, the control unit 10 determines whether a new message should be set as the one-touch message. For example, the control unit 10 determines that "1. New Messages" entry displayed as the type of the one-touch messages shown in FIG. 4(*a*) has been selected.

If the user selects the menu entry "1. New Messages," the control unit 10 will determine that a new message will be set as the one-touch message and will proceed to step 104. At step 104, the user can input the new message using the a user interface, e.g., the key input unit 30 (FIG. 1).

Moreover, if it is determined that a new message will be set as the one-touch message, the control unit 10 will display the message service types, such as "1. SMS message," "2. MMS message" and "3. EMS message" as shown in FIG. 4(*b*). When the user selects one of the three message service types, the control unit 10 displays a corresponding message input mode so that the user can input a new message of the selected type using the user interface. The new message inputted at this time can be any message, including an advertising message, a paging message, or the like.

If the user selects the displayed "1. SMS message" entry, the control unit 10 will display a text message prepared by the user as shown in FIG. 4(*c*). The user can input a text message, such as "The meeting time and place are xxx," through the user interface. If the user selects the displayed "2. MMS message" entry, the control unit 10 will display a new MMS message consisting of a text message and a picture, such as a sketch map, prepared by the user through the user interface as shown in FIG. 4(*d*). Also, the control unit 10 can display a paging message, such as "Call me at your convenient time to 016-316-9143 or 031-332-0751," as a new message as shown in FIG. 4(*e*).

After the input of a new message, at step 106 the control unit 10 determines whether there is a demand for completion of the new message input. For example, when the user presses a key corresponding to the completion of the new message input, the control unit 10 recognizes it as a demand to complete the new message input and proceeds to step 108. At step 108, the control unit 10 stores the new message to correspond to the one-touch message key.

If in step 100 it was determined that the user selected the "2. Stored Messages" entry from the displayed one-touch message types, the control unit 10 will determine in step 102 that a stored message should be set as the one-touch message and will proceed to step 110 to display stored messages on the display unit 20 (FIG. 1).

At step 112, the control unit 10 determines whether any of the messages stored in the memory 40 has been selected to be set as the one-touch message. Specifically, the control unit 10 displays the stored messages as shown in FIG. 5(*a*) at step 110. The control unit 10 can display the stored messages according to the messaging service types, i.e., "1. SMS message," "2. MMS message" and "3. EMS message." When the user selects the displayed "1. SMS message" entry the control unit 10 displays messages (for example, messages A, B and C) classified into SMS type among those messages stored in the memory 40, as shown in FIG. 5(*b*). The user can select one of the displayed messages A, B and C and set the selected message as the one-touch message using the user interface.

If the user selects the displayed "2. MMS message" entry, the control unit 10 will display messages D, E and F classified into MMS as shown in FIG. 5(*c*). The user can select one of the displayed messages D, E and F and set the selected message as the one-touch message using the user interface.

If the user selects the displayed "3. EMS message" entry, the control unit 10 will display messages G, H and I classified into EMS as shown in FIG. 5(*d*). The user can select one of the displayed messages G, H and I and set the selected message as the one-touch message using the user interface.

The control unit 10 can select at least one of the messages stored according to the messaging service types and set the selected message as the one-touch message through the interface with the user.

As described above, at step 112, the control unit determines whether one of the stored messages has been selected to be set as the one-touch message. If a message selection is completed, the control unit 10 will proceed with step 114 to store the selected message to correspond to the one-touch message key. For example, if a SMS message "A" and a MMS message "D" are selected as shown in FIG. 5, the two selected messages "A" and "D" will be stored to correspond to the one-touch message key.

FIG. 6 shows an example of a message stored to correspond to the one-touch message key according to the first embodiment of the present invention. According to FIG. 6, a SMS message "A" (FIG. 5B) and a MMS message "D" (FIG. 5C) are stored to correspond to the one-touch message key.

As described above, the mobile communication terminal according to the first embodiment of the present invention comprises a single one-touch message key. At least one message can be stored to correspond to the one-touch message key.

According to the second embodiment of the present invention, a mobile communication terminal is configured to have a plurality of one-touch message keys. Different one-touch messages can be stored to correspond to the respective one-touch message keys.

Figure 7:
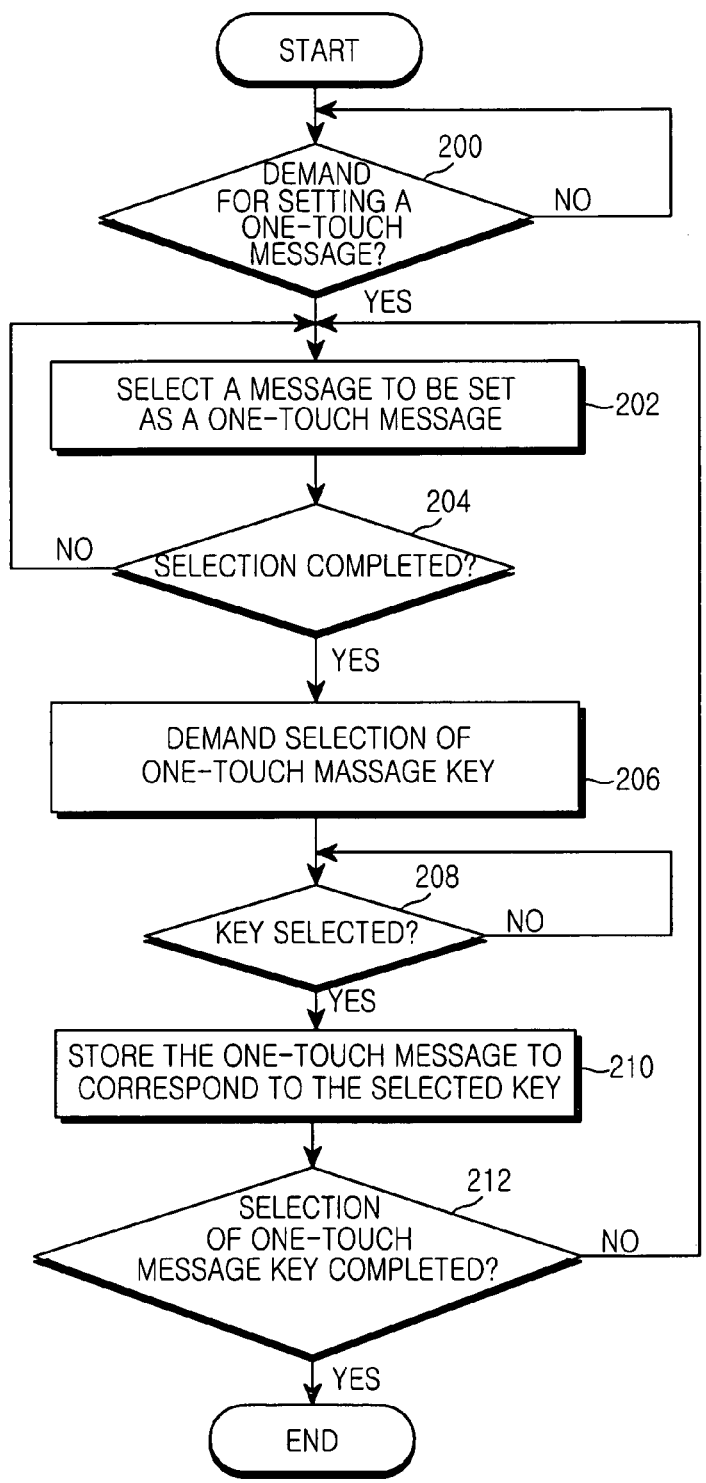
FIG. 7 is a flow chart showing a process of setting a one-touch message according to a second embodiment of the present invention.

FIG. 7 is a flow chart showing a process of setting a one-touch message according to the second embodiment of the present invention. FIG. 8 shows examples of one-touch messages stored to correspond to each of a plurality of one-touch message keys.

Hereinafter, the process of setting the one-touch message according to the second embodiment of the present invention will be explained in detail with reference to FIGS. 1 to 8.

At step 200, the control unit 10 determines whether there is a demand for setting the one-touch message. If such a demand is inputted by the user, the control unit 10 will proceed with step 202 to select a message to be set as the one-touch message.

When a desired message is selected from the stored messages, the control unit 10 determines at step 204 whether the message selection has been completed. Upon completion of the message selection, the control unit 10 proceeds with step 206 to request the selection of a one-touch message key. The control unit 10 displays a message requesting the selection of the one-touch message key on the display unit 20 (FIG. 1). At step 208, the control unit 10 determines whether the user has selected a key to be set as the one-touch message key. If a particular key is selected by the user, the control unit 10 will proceed to step 210 to store the selected message to correspond to the selected key. The key selected by the user is defined herein as a first one-touch message key. After storing the selected message to correspond to the first one-touch message key, the control unit 10 proceeds to step 212 and determines whether the selection of the one-touch message key has been completed. If there is a key input corresponding to the completion of the selection of the one-touch message key, the control unit 10 will terminate the process of setting the one-touch message. On the other hand, if no key is inputted to complete the selection of the one-touch message key, the control unit 10 will repeat steps 202 through 212 so that additional one-touch messages can be stored to correspond to a plurality of one-touch message keys, such as second and third one-touch message keys.

FIG. 8 shows examples of one-touch messages stored to correspond to at least one one-touch message key according to the second embodiment of the present invention. Specifically, FIG. 8 shows one-touch messages stored to correspond to three one-touch message keys. FIG. 8(*a*) is an example showing that the SMS message "A" (FIG. 5*b*), the MMS message "D" (FIG. 5*c*), and the EMS message "G" (FIG. 5*d*) are stored as a one-touch message corresponding to the first one-touch message key. FIG. 8(*b*) is an example showing that the SMS message "B" (FIG. 5*b*) and the EMS message "H" (FIG. 5*d*) are stored as a one-touch message corresponding to the second one-touch message key. FIG. 8(*c*) is an example showing that the SMS message "C" (FIG. 5*b*) and the MMS message "D" (FIG. 5*c*) are stored as a one-touch message corresponding to the third one-touch message key.

According to the present invention, one or more one-touch message keys are preset in the mobile communication terminal. When the user inputs a key corresponding to one-touch message transmission, one-touch messages stored in the one-touch message key are sent to the recipient.

Figure 9:
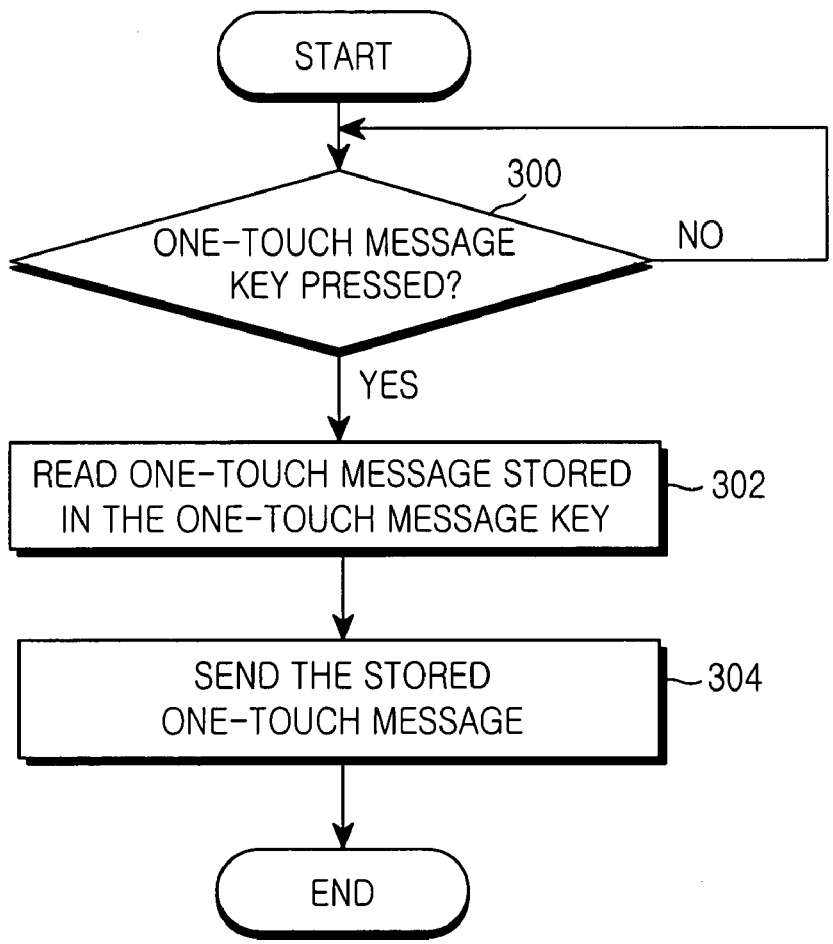
FIG. 9 is a flow chart showing a process of sending a one-touch message according to the present invention.

FIG. 9 is a flow chart showing a process of sending a one-touch message in a mobile communication terminal according to the present invention. The process of sending a one-touch message according to the user's demand for one-touch message transmission will be explained in detail with reference to FIGS. 1 to 9.

If the user inputs the recipient's telephone number in the one-touch message mode and presses a one-touch message key at step 300, the control unit 10 will proceed with step 302. At step 302, the control unit 10 read out the one-touch message stored in the pressed one-touch message key. At step 304, the control unit 10 sends the stored one-touch message to the recipient's telephone number. It should be understood that the telephone number can be replaced with an Internet destination address such as an e-mail address, the file transfer protocol (FTP) address, and the like and that the stored one-touch message will be delivered to the recipient at that address.

Figure 10:
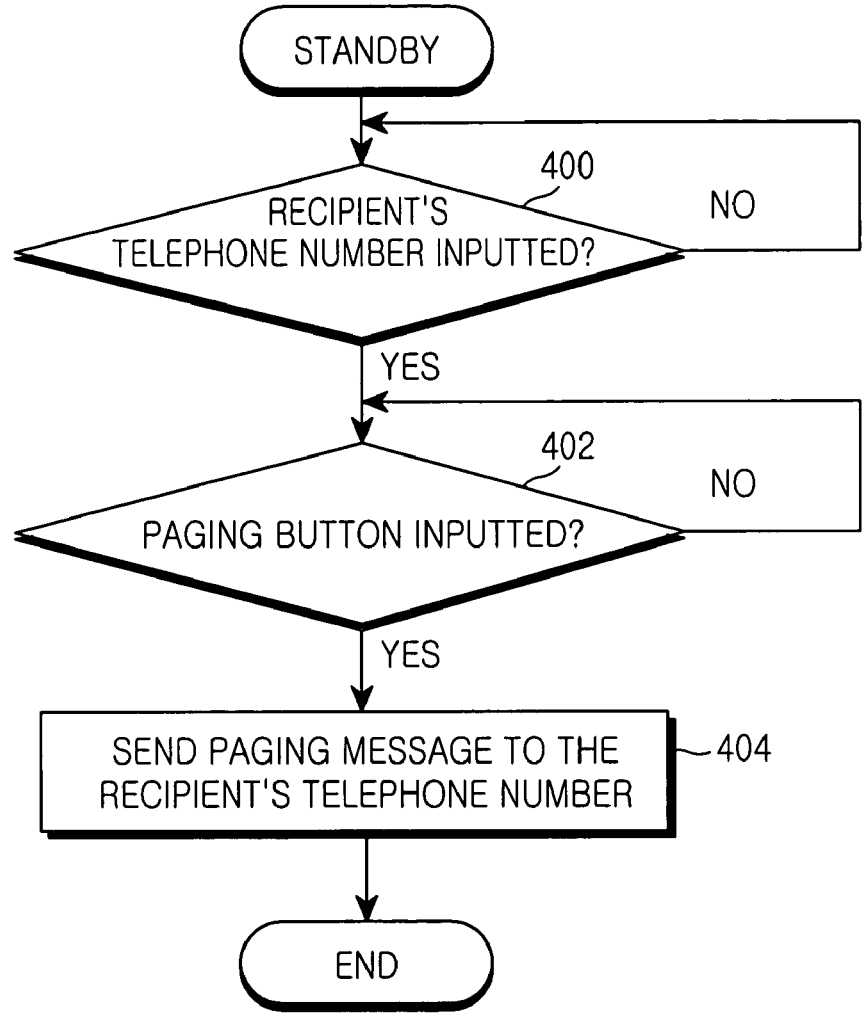
FIG. 10 is a flow chart showing a process of sending a paging message when a desired one-touch message is to page according to the first embodiment of the present invention.
Figure 11:
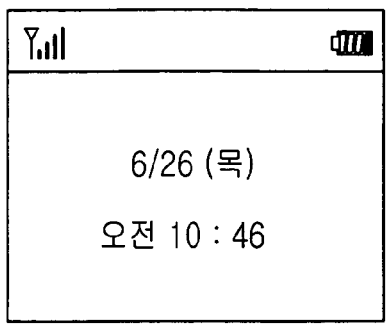
FIG. 11 is a list of messages displayed on a display unit of a sender's mobile communication terminal and that of a recipient's mobile communication terminal when a paging message has been transmitted according to the first embodiment of the present invention.
Figure 11:
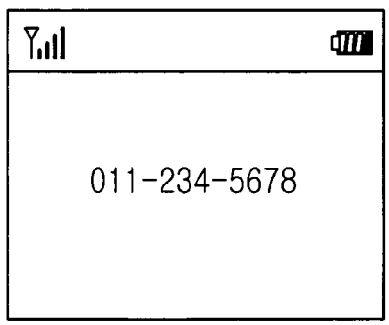
Figure 11:
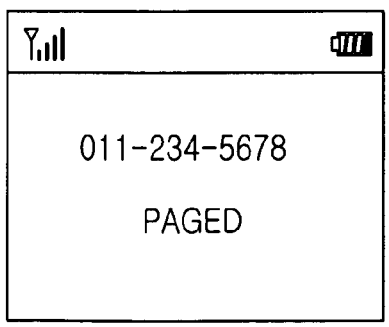
Figure 11:

FIG. 10 is a flow chart showing a process of sending a paging message according to the first embodiment of the present invention when the desired one-touch message is the paging message. FIG. 11 shows messages displayed on the display unit of the sender's mobile communication terminal and that of the recipient's mobile communication terminal when a paging message has been transmitted according to the first embodiment of the present invention.

The process of performing a paging function in a mobile communication terminal when the desired one-touch message is a paging message will be explained in detail with reference to FIGS. 1, 10 and 11.

FIG. 11A shows an example of a message displayed on the display unit of the sender's mobile communication terminal. When the user inputs the telephone number of a recipient to be paged, the control unit 10 checks and displays the inputted telephone number on the display unit 20. If the user presses a paging button at step 402, the control unit 10 will proceed with step 404 to send the paging message to the recipient's telephone number. The control unit 10 will also display a message informing the user regarding transmission of the paging message on the display unit 20.

FIG. 11B shows an example of a message displayed on the display unit of the recipient's mobile communication terminal. For example, when the paging message "Call me at your convenient time to 016-316-9143 or 031-332-0751" is received, the recipient's mobile communication terminal displays the message on its display unit 20 (FIG. 1).

As described above, the mobile communication terminal according to the present invention enables the user to easily and rapidly send a preset message by a single key input. Therefore, the user can rapidly send a message in critical circumstances. Also, the user can easily page a person by pressing a single key after inputting the recipient's telephone number. According to the present invention, it is possible to send a plurality of messages in different forms all together by a single key input, without the need to take multiple steps of selecting menus to send those messages.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication terminal for one-touch message transmission, which comprises:
a key input unit including a one-touch message key, the key input unit outputting a signal requesting one-touch message transmission when the one-touch message key is pressed after a telephone-number is pressed;
a display unit for displaying menus for one-touch message transmission;
a memory for storing a message corresponding to the one-touch message key; and
a control unit for sending the stored message corresponding to the one-touch message key when a user inputs a demand for one-touch message transmission.

2. The mobile communication terminal according to claim 1, wherein said one-touch message key is implemented by pressing a send key for a period selected from a longer and shorter time duration than the key-pressing time for initiating a phone call after inputting a telephone number in standby mode.

3. The mobile communication terminal according to claim 1, wherein said one-touch message key is separately and independently provided on the key input unit.

4. The mobile communication terminal according to claim 1, wherein said memory stores messages in different areas according to messaging service types.

5. The mobile communication terminal according to claim 4, wherein said message service types include a short message service (SMS), a multimedia messaging service (MMS), and an enhanced messaging service (EMS).

6. The mobile communication terminal according to claim 1, wherein a plurality of messages are stored to correspond to said one-touch message key.

7. The mobile communication terminal according to claim 1, wherein a paging message is stored to correspond to said one-touch message key.

8. The mobile communication terminal according to claim 7, wherein said one-touch message key is a paging button.

9. A mobile communication terminal for one-touch message transmission, which comprises:
a key input unit including a plurality of one-touch message keys, the key input unit outputting a signal requesting one-touch message transmission when a user presses one of the one-touch message keys after a telephone-number is pressed;
a display unit for displaying menus for one-touch message transmission;
a memory for storing messages corresponding respectively to the plurality of one-touch message keys; and
a control unit for sending a message stored to correspond to the pressed one-touch message key when the user inputs a demand for the one-touch message transmission.

10. The mobile communication terminal according to claim 9, wherein said memory stores messages in different areas according to messaging service types.

11. The mobile communication terminal according to claim 10, wherein said message service types include SMS, MMS and EMS.

12. The mobile communication terminal according to claim 9, wherein at least one message is stored to correspond to each of said plurality of one-touch message keys.

13. The mobile communication terminal according to claim 9, wherein a paging message is stored to correspond to at least one of the one-touch message keys.

14. The mobile communication terminal according to claim 13, wherein one of said one-touch message keys is a paging button.

* * * * *